US012675967B2

(12) United States Patent
Yamazaki et al.

(10) Patent No.: US 12,675,967 B2
(45) Date of Patent: Jul. 7, 2026

(54) IMAGE PROCESSING APPARATUS, IMAGE PROCESSING METHOD, IMAGE PROCESSING SYSTEM, AND STORAGE MEDIUM

(71) Applicant: CANON KABUSHIKI KAISHA, Tokyo (JP)

(72) Inventors: Yasuyuki Yamazaki, Tokyo (JP); Kenshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 18/179,258

(22) Filed: Mar. 6, 2023

(65) Prior Publication Data

US 2023/0290106 A1 Sep. 14, 2023

(30) Foreign Application Priority Data

Mar. 10, 2022 (JP) ................................. 2022-037599
Mar. 10, 2022 (JP) ................................. 2022-037600

(51) Int. Cl.
*G06V 10/25* (2022.01)
*G06T 7/62* (2017.01)
*G06T 7/70* (2017.01)
*G06V 10/74* (2022.01)
*G06V 10/82* (2022.01)

(52) U.S. Cl.
CPC ................ *G06V 10/25* (2022.01); *G06T 7/62* (2017.01); *G06T 7/70* (2017.01); *G06V 10/761* (2022.01); *G06T 2207/20084* (2013.01); *G06V 2201/07* (2022.01)

(58) Field of Classification Search
CPC ........... G06T 2207/20076; G06T 2207/20081; G06T 2207/20084; G06T 7/62; G06T 7/70; G06V 10/25; G06V 10/761; G06V 10/82; G06V 2201/07
See application file for complete search history.

(56) References Cited

U.S. PATENT DOCUMENTS

2012/0057748 A1* 3/2012 Katano ................... G06T 7/248
382/103
2017/0147905 A1* 5/2017 Huang ................ G06F 18/2411
(Continued)

FOREIGN PATENT DOCUMENTS

JP 2019032773 A 2/2019
JP 2020042765 A 3/2020
JP 2020173678 A 10/2020

OTHER PUBLICATIONS

Xingyi Zhou et al., "Objects as Points", arXiv:1904.07850v2 [cs. CV], Apr. 25, 2019.

*Primary Examiner* — Chineyere Wills-Burns
(74) *Attorney, Agent, or Firm* — Canon U.S.A., Inc. IP Division

(57) ABSTRACT
A captured image is acquired, an instruction with respect to the captured image acquired is received, a likelihood map indicating likelihood of presence of an object in a predetermined region of regions into which the captured image is divided is acquired, a region indicating a position and size of the object in the captured image is estimated, and an object region corresponding to the instruction is determined using the likelihood map and one or more object region candidates selected from the estimated region based on the position indicated by the received instruction.

12 Claims, 12 Drawing Sheets

(56)         References Cited

U.S. PATENT DOCUMENTS

| 2017/0309028 | A1* | 10/2017 | Nishiyama | G06T 7/11 |
|---|---|---|---|---|
| 2018/0357518 | A1* | 12/2018 | Sekii | G06V 40/103 |
| 2019/0180119 | A1* | 6/2019 | Chen | G06V 20/58 |
| 2019/0206085 | A1* | 7/2019 | Jiang | G06T 7/74 |
| 2019/0236394 | A1* | 8/2019 | Price | G06V 10/454 |
| 2020/0151492 | A1* | 5/2020 | Chen | G06F 18/241 |
| 2024/0070903 | A1* | 2/2024 | Saito | G06T 7/73 |

* cited by examiner

300

301                302

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 1 | 3 | 3 | 1 | 0 | 0 |
| 0 | 0 | 0 | 2 | 10 | 24 | 24 | 11 | 2 | 0 |
| 0 | 0 | 1 | 7 | 39 | 95 | 100 | 44 | 8 | 1 |
| 0 | 0 | 1 | 12 | 108 | 176 | 204 | 90 | 16 | 2 |
| 0 | 0 | 1 | 10 | 99 | 174 | 195 | 87 | 15 | 1 |
| 0 | 0 | 0 | 4 | 24 | 70 | 81 | 36 | 7 | 1 |
| 0 | 0 | 0 | 1 | 4 | 12 | 14 | 6 | 1 | 0 |

304

| -5 | -15 | 10 | 12 | -12 | -34 | -9 | -49 | -15 | -3 |
|----|----|----|----|----|----|----|----|----|----|
| 0 | 5 | -15 | -8 | 2 | 4 | -4 | -53 | 5 | 14 |
| 4 | 10 | 12 | 43 | 2 | 3 | -2 | -53 | -4 | -13 |
| 15 | 0 | 11 | 53 | 0 | 2 | -2 | -51 | -13 | 5 |
| 20 | 19 | 0 | 45 | -1 | 1 | 3 | -49 | -7 | -14 |
| -13 | -16 | 8 | 43 | -1 | 5 | -4 | -53 | 0 | -7 |
| -7 | -8 | -13 | 45 | -1 | 3 | -3 | -52 | 20 | 8 |
| 5 | 7 | -16 | 2 | 2 | 4 | -4 | -53 | 7 | -2 |

| 10 | -3 | 2 | -20 | 20 | -6 | 7 | 18 | 4 | -16 |
|----|----|----|----|----|----|----|----|----|----|
| 3 | -17 | 20 | 12 | 123 | 116 | 147 | 17 | 5 | 12 |
| -14 | 3 | -9 | 12 | 75 | 88 | 97 | 98 | 7 | 10 |
| -4 | 11 | -15 | 15 | 12 | 47 | 53 | 44 | -9 | 16 |
| -6 | -5 | 91 | -42 | -41 | -2 | -2 | -6 | 6 | 17 |
| 10 | -10 | 5 | -98 | -103 | -52 | -57 | -43 | -9 | 14 |
| -16 | 10 | -5 | -155 | -144 | -111 | -120 | -110 | -5 | -5 |
| 1 | 2 | -16 | 20 | -26 | -16 | -153 | -166 | -3 | -9 |

| 370 | 176 | 128 | 356 | 78 | 224 | 370 | 360 | 394 | 236 |
|----|----|----|----|----|----|----|----|----|----|
| 300 | 176 | 102 | 382 | 174 | 204 | 178 | 180 | 218 | 464 |
| 14 | 198 | 282 | 354 | 182 | 196 | 166 | 146 | 14 | 344 |
| 406 | 56 | 344 | 184 | 156 | 230 | 146 | 164 | 352 | 296 |
| 72 | 94 | 380 | 150 | 160 | 234 | 166 | 148 | 206 | 186 |
| 140 | 22 | 500 | 178 | 186 | 226 | 174 | 160 | 292 | 256 |
| 292 | 472 | 380 | 164 | 178 | 198 | 172 | 166 | 358 | 268 |
| 318 | 124 | 86 | 88 | 150 | 228 | 166 | 184 | 0 | 38 |

| 478 | 312 | 86 | 290 | 242 | 454 | 104 | 260 | 466 | 160 |
|----|----|----|----|----|----|----|----|----|----|
| 430 | 182 | 122 | 354 | 354 | 360 | 344 | 354 | 306 | 168 |
| 178 | 408 | 358 | 276 | 338 | 342 | 364 | 348 | 166 | 114 |
| 164 | 332 | 398 | 334 | 352 | 344 | 334 | 330 | 278 | 412 |
| 242 | 26 | 454 | 352 | 322 | 344 | 346 | 340 | 116 | 114 |
| 6 | 286 | 158 | 364 | 320 | 342 | 330 | 344 | 44 | 82 |
| 362 | 212 | 344 | 368 | 352 | 334 | 342 | 362 | 74 | 42 |
| 386 | 4 | 464 | 420 | 346 | 342 | 358 | 366 | 480 | 350 |

FIG.5

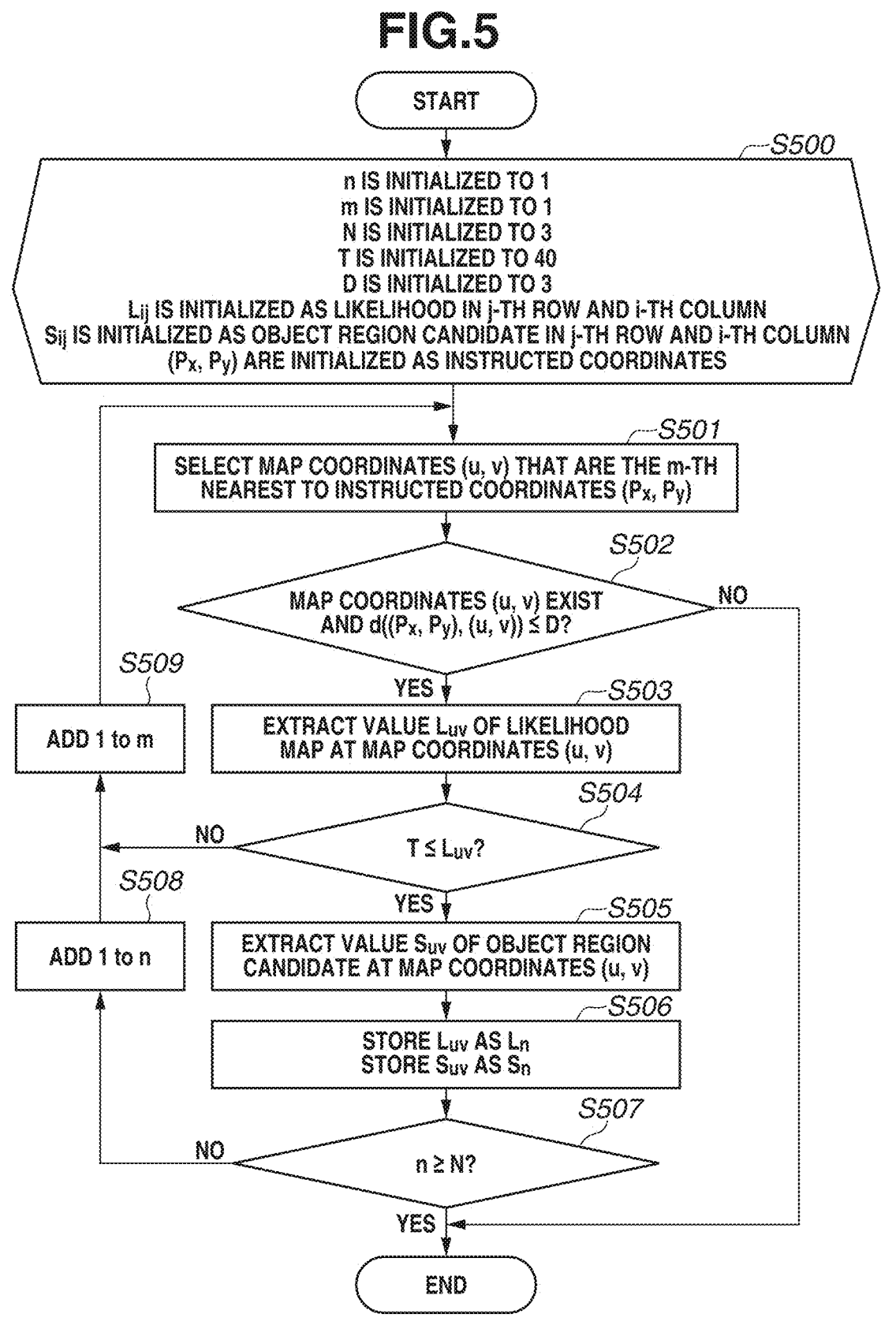

START

S500 n IS INITIALIZED TO 1
m IS INITIALIZED TO 1
N IS INITIALIZED TO 3
T IS INITIALIZED TO 40
D IS INITIALIZED TO 3
$L_{ij}$ IS INITIALIZED AS LIKELIHOOD IN j-TH ROW AND i-TH COLUMN
$S_{ij}$ IS INITIALIZED AS OBJECT REGION CANDIDATE IN j-TH ROW AND i-TH COLUMN
$(P_x, P_y)$ ARE INITIALIZED AS INSTRUCTED COORDINATES

S501
SELECT MAP COORDINATES (u, v) THAT ARE THE m-TH
NEAREST TO INSTRUCTED COORDINATES $(P_x, P_y)$

S502
MAP COORDINATES (u, v) EXIST
AND $d((P_x, P_y), (u, v)) \leq D$?    NO

YES

S503
EXTRACT VALUE $L_{uv}$ OF LIKELIHOOD
MAP AT MAP COORDINATES (u, v)

S509
ADD 1 to m

S504
$T \leq L_{uv}$?    NO

YES

S505
EXTRACT VALUE $S_{uv}$ OF OBJECT REGION
CANDIDATE AT MAP COORDINATES (u, v)

S508
ADD 1 to n

S506
STORE $L_{uv}$ AS $L_n$
STORE $S_{uv}$ AS $S_n$

S507
NO    $n \geq N$?

YES

END

IMAGE PROCESSING APPARATUS  1100

IMAGING APPARATUS  110

IMAGE ACQUISITION UNIT  101

INSTRUCTION RECEPTION UNIT  104

LIKELIHOOD MAP ACQUISITION UNIT  102

SECOND LIKELIHOOD MAP ACQUISITION UNIT  1101

ESTIMATION UNIT  103

OBJECT REGION DETERMINATION UNIT  105

OBJECT REGION CORRECTION UNIT  1102

RESULT OUTPUT UNIT  120

IMAGE PROCESSING APPARATUS, IMAGE PROCESSING METHOD, IMAGE PROCESSING SYSTEM, AND STORAGE MEDIUM

BACKGROUND OF THE DISCLOSURE

Field of the Disclosure

The present disclosure relates to an image processing technique for detecting a subject.

Description of the Related Art

Object detection is one field of research on computer vision, and has been extensively studied. Computer vision is a technique for understanding an image input to a computer and recognizing various characteristics of the image. In the technique, the object detection is a task of estimating the position and type of an object that exists in a natural image. According to "Objects as Points" by Xingyi Zhou1 et. al. in 2019, a likelihood map indicating the center of an object is acquired using a multi-layered neural network and a peak point of the likelihood map is extracted, so that a center position of the object is detected. In addition, an offset amount corresponding to the center position and an object size are inferred, thus acquiring a bounding box of the object serving as a detection target.

The object detection is applicable to the autofocus function of an imaging apparatus. In Japanese Patent Application Laid-Open No. 2020-173678, coordinates designated by a user are received, and input, together with an image, to a multi-layered neural network, so that a main subject based on the user's intention is detected and the autofocus function is implemented. In Japanese Patent Application Laid-Open No. 2020-173678, a position map, in addition to the likelihood map, is generated in the multi-layered neural network based on two-dimensional Gaussian distribution from the designated coordinates. Furthermore, the position map and the likelihood map are integrated in the multi-layered neural network, so that the main subject is detected. In a case where there is a peak of the likelihood map near the designated coordinates, a degree of contribution of the position map is increased in integration processing. Otherwise, the degree of contribution is decreased. Furthermore, in Japanese Patent Application Laid-Open No. 2020-173678, Gaussian distribution is adjusted at the time of generation of the position map from the designated map using imaging information such as an electronic zoom factor and an amount of camera shake. For example, in a case where the amount of camera shake is acquired as the imaging information, instructing the coordinates of a subject is presumably difficult with a large amount of camera shake, and thus a range of the position map is widened.

As described above, Japanese Patent Application Laid-Open No. 2020-173678 discusses a method of detecting the main subject based on the user's intention. However, according to Japanese Patent Application Laid-Open No. 2020-173678, in a case where there is a plurality of subjects belonging to an identical category, it is difficult to automatically focus on the subject as intended by the user. For example, consideration is given to a case where subjects belonging to an identical category are positioned behind each other. At this time, assume that a subject behind another subject is partially hidden to overlap with the subject on the front side. If the user designates the subject behind the other subject in this case, there is a possibility that features of the subject behind the other subject cannot be extracted sufficiently, reliability of the position map decreases, and the subject behind the other subject cannot be detected correctly. Or there is a possibility for an increase in reliability of the position map with respect to the subject, features of which can be extracted sufficiently, so that the subject in front of the other subject may be treated as the main subject. According to Japanese Patent Application Laid-Open No. 2020-173678, in a case where the face and body of a dog serve as features of the main subject, main subject detection units each of which reacts to one of the face and the body are to be prepared. There are an infinite number of objects that can serve as the main subject, and it is difficult to prepare main subject detection units for all of the objects.

Assume that the technique discussed in "Objects as Points" by Xingyi Zhou1 et. al. in 2019 is applied to the case where subjects belonging to an identical category are positioned behind each other and a result of detection of an object the center of which is nearest to the instructed coordinates is used. It is difficult to infer a likelihood map indicating the center with subjects behind each other separated, so that the likelihood map may have the peak in the subject in front of the other subject.

SUMMARY OF THE DISCLOSURE

An image processing apparatus according to the present disclosure has the following configuration. The present disclosure is directed to an image processing apparatus capable of detecting a subject region intended by a user. The present disclosure is also directed to a method for the image processing apparatus and a program for the image processing apparatus.

According to an aspect of the present disclosure, an image processing apparatus includes an image acquisition unit configured to acquire a captured image, an instruction reception unit configured to receive an instruction with respect to the captured image acquired by the image acquisition unit, a likelihood map acquisition unit configured to acquire a likelihood map indicating likelihood of presence of an object in a predetermined region of regions into which the captured image is divided, an estimation unit configured to estimate a region indicating a position and size of the object in the captured image, and a determination unit configured to determine an object region corresponding to the instruction using the likelihood map and one or more object region candidates selected from the estimated region based on the position indicated by the instruction received by the instruction reception unit.

Further features of the present disclosure will become apparent from the following description of exemplary embodiments with reference to the attached drawings.

BRIEF DESCRIPTION OF THE DRAWINGS

FIG. 5 is a detailed flowchart of selection of object region candidates.

DESCRIPTION OF THE EMBODIMENTS

Figure 1:
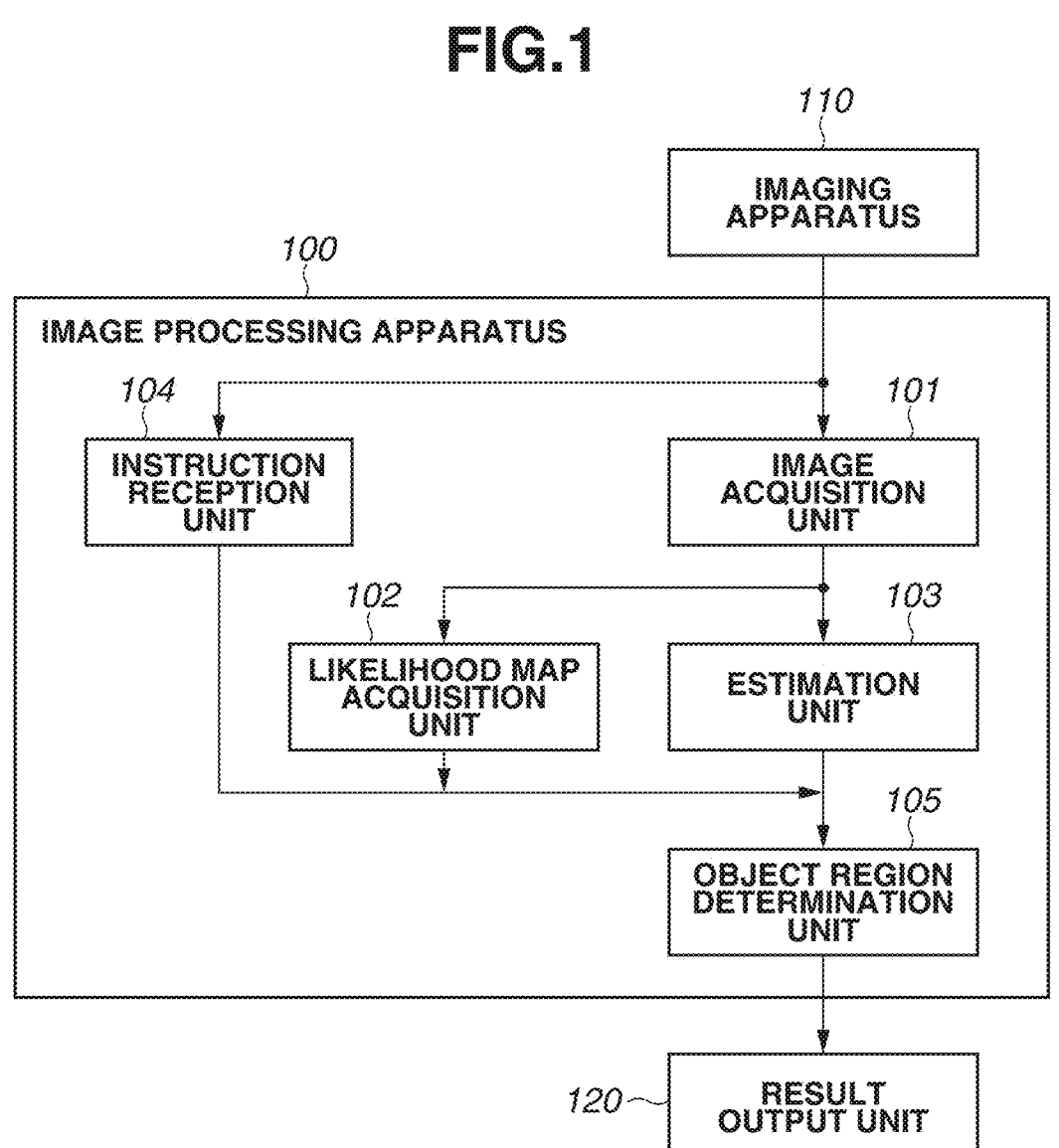
FIG. 1 is a block diagram schematically illustrating an image processing apparatus.

The present disclosure will be described in detail below based on exemplary embodiments of the present disclosure with reference to the accompanying drawings. Configurations described in the following exemplary embodiments are merely examples, and the present disclosure is not limited to the configurations illustrated in the drawings.

A first exemplary embodiment of the present disclosure will be described below. FIG. 1 is a block diagram schematically illustrating an image processing apparatus according to the present exemplary embodiment. A configuration according to the present exemplary embodiment will be described with reference to FIG. 1. Here, a description will be provided of only an outline, and details will be described below.

An imaging apparatus 110 includes an optical system and an image pickup element. The imaging apparatus 110 captures an image and outputs the image to an image acquisition unit 101. For example, an imaging apparatus to be used can be a digital camera and a monitoring camera. The imaging apparatus 110 has an interface that receives input from a user, and outputs the input from the user to an instruction reception unit 104. For example, the imaging apparatus 110 can include a touch display as the interface and output a result of a touch operation performed by the user to the instruction reception unit 104.

An image processing apparatus 100 includes the image acquisition unit 101, a likelihood map acquisition unit 102, an estimation unit 103, the instruction reception unit 104, and an object region determination unit 105 which performs at least one of object region candidate selection and object region candidate integration. The image acquisition unit 101 receives an image from the imaging apparatus 110. The image is input to the likelihood map acquisition unit 102 and the estimation unit 103. The likelihood map acquisition unit 102 acquires a likelihood map, and the estimation unit 103 acquires an object region candidate. The instruction reception unit 104 acquires a user instruction from the imaging apparatus 110. More specifically, the instruction reception unit 104 acquires one point at instructed coordinates input through a touch operation of the user. The object region determination unit 105 selects one or more object region candidates for a target of integration processing from the object region candidates based on the likelihood map and the instructed coordinates. The object region determination unit 105 integrates the selected object region candidates and acquires one object region. Alternatively, part of a functional configuration of the image processing apparatus 100 (e.g., the likelihood map acquisition unit 102, the estimation unit 103, and the object region determination unit 105) can be implemented as an image processing system included in an image processing apparatus on a network. The image processing apparatus 100 includes hardware devices, such as a central processing unit (CPU), a read-only memory (ROM), a random-access memory (RAM), and various interfaces, which are not illustrated.

A result output unit 120 outputs the object region. The output object region is applied to, for example, an autofocus function of a camera. For example, some distance measurement points among the object region are sampled, and the sampled distance measurement points are usable for a phase difference AF. Accurate detection of the object region intended by the user improves the accuracy of autofocus.

Figure 2:
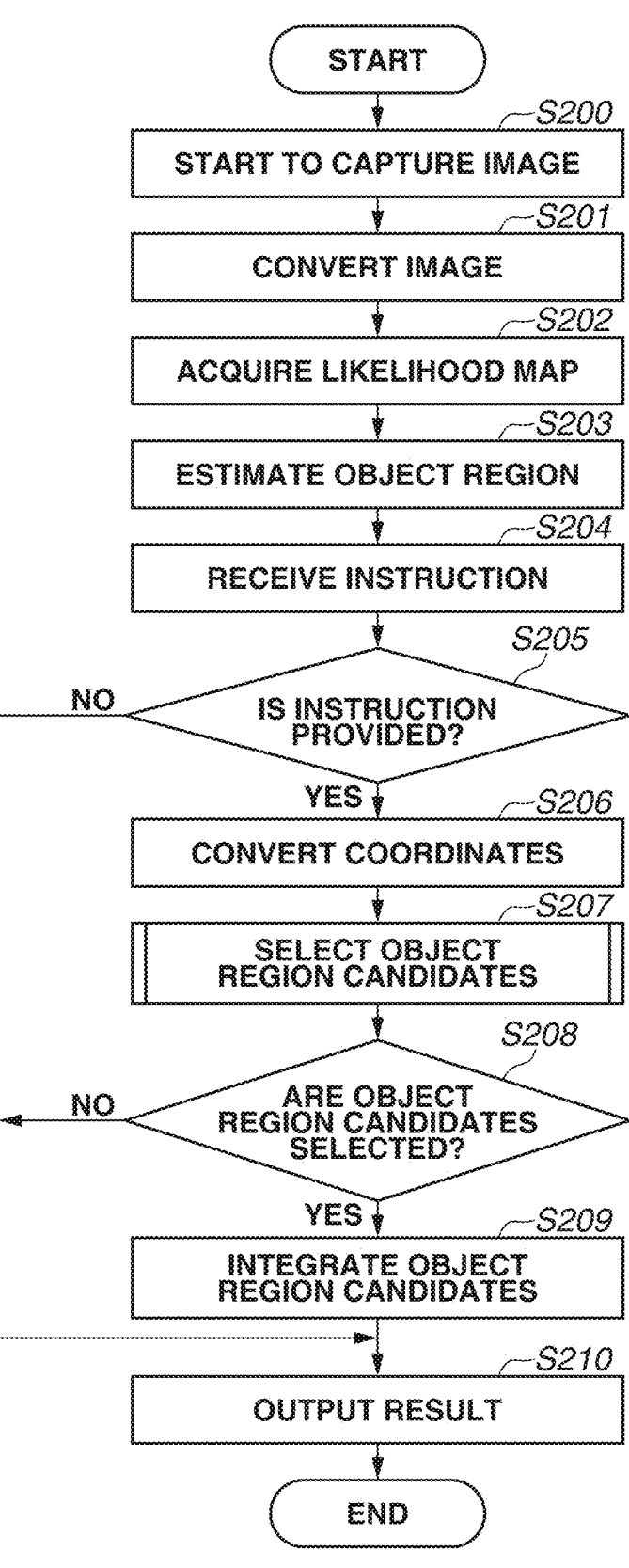
FIG. 2 is a flowchart of processing according to a first exemplary embodiment.

FIG. 2 is a flowchart illustrating processing of the image processing apparatus 100 according to the present exemplary embodiment. The flowchart is implemented by the CPU executing a control program. Here, a description will be provided of only an outline, and details will be described below.

In step S200, the imaging apparatus 110 starts to capture an image. In step S201, the image acquisition unit 101 of the image processing apparatus 100 converts the captured image into an image at a predetermined resolution. In step S202, the likelihood map acquisition unit 102 acquires the likelihood map based on the converted image. In step S203, the estimation unit 103 acquires object region candidates based on the converted image. In step S204, the instruction reception unit 104 receives an instruction for coordinates from the user. In step S205, the CPU determines whether an instruction is provided. If the CPU determines that no instruction is provided (NO in step S205), the processing proceeds to step S210. In step S210, the result output unit 120 outputs a result indicating that there is no object region. If the CPU determines that an instruction is provided (YES in step S205), the processing proceeds to step S206. In step S206, the CPU converts the instructed coordinates that has been received to coordinates corresponding to the resolution converted in step S201. In step S207, the object region determination unit 105 selects object region candidates based on the instructed coordinates resulting from the conversion. Details of the flowchart in step S207 will be described below with reference to FIG. 5. In step S208, the CPU determines whether the object region candidates have been selected as a result of the processing in step S207. If the CPU determines that no object region candidate has been selected (NO in step S208), the processing proceeds to step S210. In step S210, the result output unit 120 outputs a result indicating that there is no object region. If the CPU determines that the object region candidates have been selected (YES in step S208), the processing proceeds to step S209. In step S209, the object region determination unit 105 integrates one or more selected object region candidates. In step S210, the result output unit 120 outputs one object region. While the description has been provided of the operations in steps S207 to S209 individually, the operations in steps S207 to S209 are a series of operations of determining the object region.

<Image Conversion>

The image conversion described in step S201 in FIG. 2 is now described. In the present exemplary embodiment, the image acquisition unit 101 initially starts to capture an image and acquires the captured image in step S200. The captured image is, for example, a red, green, blue (RGB) image having a width of 6000 pixels and a height of 4000 pixels. In step S201, the CPU converts the captured image into an image having a predetermined size in accordance with an input format of a multi-layered neural network that acquires the likelihood map and the object region candidates. In the present exemplary embodiment, an input size of the multi-layered neural network is, for example, an RGB image having a width of 500 pixels and a height of 400 pixels. In the present exemplary embodiment, left and right regions of 500 pixels are cut out from the captured image, and the captured image is reduced to one-tenth its original size. Alternatively, a black image of 400 pixels may be padded to upper and lower regions of the captured image and the captured image is reduced to one-twelfth its original size. Yet alternatively, a region having a width of 500 pixels and a height of 400 pixels may be directly cut out from the captured image. In the present exemplary embodiment, the converted image has a point of origin at a pixel on an upper left corner, and coordinates thereof are set to (0, 0). Coordinates (i, j) represent coordinates in a j-th row and an i-th column, and a pixel at a lower right corner has coordinates (499, 399). A coordinate system of the converted image is hereinafter referred to as an image coordinate system.

<Acquisition of Likelihood Map>

The acquisition of the likelihood map that is performed by the likelihood map acquisition unit 102 in FIG. 1 and that is performed in step S202 in FIG. 2 is now described with reference to FIGS. 3A and 3B. In the present exemplary embodiment, as described in "Objects as Points" by Xingyi Zhoul et. al. in 2019, the likelihood map is acquired from the multi-layered neural network. What is input to the multi-layered neural network is an image having been subjected to resolution conversion, and is a three-channel RGB image having a width of 500 pixels and a height of 400 pixels. What is output from the multi-layered neural network is a one-channel tensor (matrix) having ten columns and eight rows. The acquired tensor (matrix) is referred to as the likelihood map. Assume that the likelihood map (a first channel of the likelihood map) has a point of origin in a pixel on an upper left corner, and coordinates thereof are set to (0, 0). Coordinates (i, j) represent coordinates in a j-th row and an i-th column, and a pixel at a lower right corner has coordinates (9, 7). A coordinate system of the likelihood map is hereinafter referred to as a map coordinate system. The likelihood map can be acquired by calculation in the image processing apparatus 100. Alternatively, the likelihood map that are obtained through calculation performed outside the image processing apparatus 100 can be acquired by the likelihood map acquisition unit 102 in the image processing apparatus 100.

The multi-layered neural network that acquires the likelihood map has been preliminarily trained with a multitude of training data (pairs of images and likelihood maps). Refer to "Objects as Points" by Xingyi Zhoul et. al. in 2019 for details. The likelihood map in the present exemplary embodiment is assumed to be a saliency map with reaction to every object, but may be a map with reaction to a specific object. In the saliency map, reactions to a portion on which a person is likely to focus are exhibited.

Figures 3A, 3B:
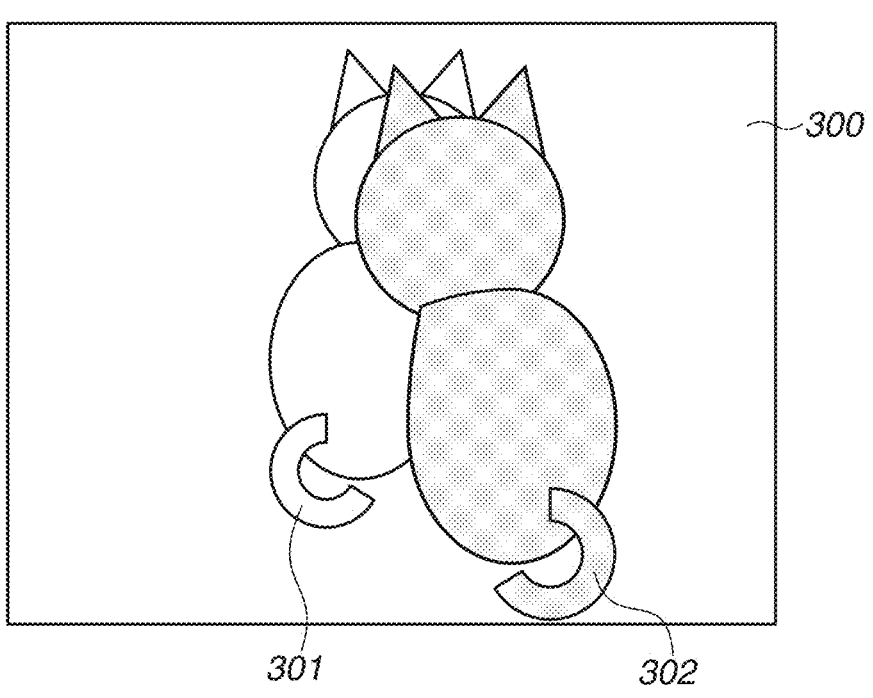
FIG. 3A illustrates an example of a captured image in which two subjects appear.
FIG. 3B illustrates an example of a likelihood map for the captured image.

FIG. 3A illustrates an example of a captured image having been subjected to image conversion. FIG. 3B illustrates an example of a likelihood map corresponding to the captured image having been subjected to the image conversion. A captured image 300 having been subjected to the image conversion includes two subjects, namely, a subject 301 behind a subject 302. Each element of the likelihood map represents likelihood that any object is present at a location corresponding to the element. The likelihood of the presence takes a value from 0 to 255. A higher value means higher likelihood of the presence. In FIG. 3B, each element is illustrated so that a color thereof becomes lighter as the likelihood becomes lower, and the color thereof becomes darker as the likelihood becomes higher. A likelihood map 304 is acquired so that likelihood with respect to the subject 302 in front of the subject 301 is higher than the subject 301, and provides maximum likelihood of 204 at coordinates (6, 4).

<Acquisition of Object Region Candidates>

The estimation of the object region candidates that is performed by the estimation unit 103 in FIG. 1 and that is performed in step S203 in FIG. 2 is now described with reference to FIGS. 4A to 4E. The object region candidates are also acquired using the multi-layered neural network, as in the operation of acquiring the likelihood map. What is input to the multi-layered neural network is, as in the acquisition of the likelihood map, an image having been subjected to the resolution conversion, and is a three-channel RGB image having a width of 500 pixels and a height of 400 pixels. What is output from the multi-layered neural network is a four channel tensor having ten columns and eight rows. The first channel of the tensor represents an offset amount in an x-direction from the corresponding element to the center of the object, and the second channel similarly represents an offset amount in a y-direction. The third channel of the tensor represents a width of the object indicated by the corresponding element, and the fourth channel similarly represents a height of the object indicated by the corresponding element. A center position of the object and a size of the object are obtainable from these pieces of four channel information. The tensor is referred to as an object region candidate tensor. In the present exemplary embodiment, each channel of the object region candidate tensor has the same numbers of rows and columns as that for the likelihood map, and a coordinate system of the object region candidate tensor also serves as a map coordinate system. The numbers of columns and rows of each channel of the object region candidate tensor may be different from those of the likelihood map. In a case where the numbers are different, the numbers of columns and rows of each channel of the object region candidate tensor may be matched with those of the likelihood map by interpolation (e.g., bilinear interpolation). The object region candidates can be acquired by calculation in the image processing apparatus 100. Alternatively, the object region candidates that are obtained through calculation performed outside the image processing apparatus 100 can be acquired by the estimation unit 103 in the image processing apparatus 100.

The multi-layered neural network that acquires the object region candidate tensor has been preliminarily trained with a multitude of training data (sets of images, offset amounts, widths, and heights), as in the acquisition of the likelihood map. The multi-layered neural network that simultaneously outputs information for the four channels is used in the present exemplary embodiment, but four multi-layered neural networks that output information for the respective channel are prepared and results thereof may be integrated.

Figures 4A, 4B, 4C, 4D, 4E:
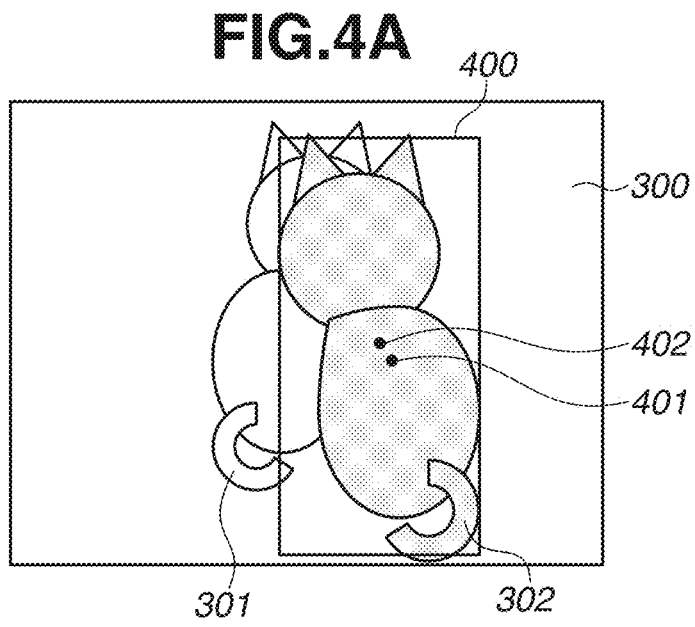
FIGS. 4A to 4E each illustrate an example of an object region candidate.

FIG. 4A illustrates an example of a captured image having been subjected to image conversion. FIG. 4B illustrates a map of an offset amount toward the center of the object in the x-direction. FIG. 4C illustrates a map of an offset amount toward the center of the object in the y-direction. FIG. 4D illustrates a map of a width of the object. FIG. 4E illustrates a map of a height of the object. Here, a value of each element indicated in FIGS. 4B to 4D is expressed in units of pixels. In this example, the offset amount in the x-direction is a positive value in the right direction, and the offset amount in the y-direction is a positive value in the lower direction.

Now attention is given to the coordinates (6, 4) at which the likelihood becomes a maximum value in FIG. 3B. A white/black inverted element in each of FIGS. 4B to 4D is a portion of interest. In FIG. 4A, a point 401 is a portion corresponding to the portion of interest on the image. In the portion of interest, the offset amount in the x-direction is −3, and the offset amount in the y-direction is −2. In other words, a point 402 that is shifted from the point 401 in the upper left direction is acquired as the center of the object.

The map coordinates can be converted to the image coordinates using the following Expression 1.

$$(I_x, I_y) = \left( M_x \times \frac{I_w}{M_w} + \frac{I_w}{2M_w}, M_y \times \frac{I_h}{M_H} + \frac{I_h}{2M_H} \right) \qquad \text{Expression 1}$$

In Expression 1, $I_w$ and $I_h$ represent a width and height of the captured image having been subjected to the image conversion, respectively, and $M_w$ and $M_h$ represent a width and height of the map, respectively. $(I_x, I_y)$ indicate a point of the image coordinate system, and $(M_x, M_y)$ indicate a point of the map coordinate system. According to Expression 1, the map coordinates (6, 4) of the point are converted into image coordinates (325, 225). That is, the image coordinates of the point 401 in FIG. 4A are (325, 225), and image coordinates (322, 222) of the point 402 are obtained as a result of addition of the offset amounts to the image coordinates (325, 225).

The width and height of the object in the portion of interest are 166 and 348, respectively, from FIGS. 4D and 4E. Thus, an object region candidate 400 in the portion of interest is centered at coordinates (322, 222) and expressed as a rectangle having a width of 166 and a height of 348 in the image coordinate system.

The object region candidate is expressed using the offset amounts in the upper, lower, left, and right directions and the width and height of the object in the present exemplary embodiment, but may be expressed using, for example, respective distances to left and right ends and upper and lower ends.

<Selection of Object Region Candidates>

The selection of the object region candidates that is performed by the object region determination unit 105 in FIG. 1 and that is performed in step S207 in FIG. 2 is now described with reference to a detailed flowchart in FIG. 5. Initially, in preparation step S500, variables are initialized. As the variables, n and m represent count values, N represents the number of object region candidates to be selected, T is a threshold for likelihood, D is a threshold for a distance, $L_{ij}$ is likelihood, $S_{ij}$ is an object region candidate, and $(P_x, P_y)$ are coordinates (instructed coordinates) acquired by the instruction reception unit 104. The instructed coordinates $(P_x, P_y)$ are obtained by conversion of the instructed coordinates provided in the image coordinate system into coordinates in the map coordinate system based on Expression 1, and are a two-dimensional real vector. In step S501, the object region determination unit 105 selects, from all map coordinates, map coordinates (u, v) that are the m-th nearest to the instructed coordinates $(P_x, P_y)$. The map coordinates (u, v) are a two-dimensional integer vector. In step S502, the object region determination unit 105 determines whether the map coordinates (u, v) exist. If the map coordinates (u, v) are determined to exist, the object region determination unit 105 acquires a distance between the instructed coordinates $(P_x, P_y)$ and the map coordinates (u, v), and determines whether the distance is less than or equal to a threshold D. If the distance is less than or equal to the threshold D (YES in step S502), the processing proceeds to subsequent step S503. Otherwise (NO in step S502), the processing ends. In the present exemplary embodiment, a Euclidean distance (Expression 2) is used as a distance function, but another distance function may be used.

$$d((P_x, P_y), (u, v)) = \sqrt{(P_x - u)^2 + (P_y - v)^2} \qquad \text{Expression 2}$$

In step S503, the object region determination unit 105 extracts a likelihood map $L_{uv}$ corresponding to the map coordinates (u, v). In step S504, the object region determination unit 105 compares $L_{uv}$ and a threshold T for likelihood. If $L_{uv}$ is more than or equal to T (YES in step S504), the processing proceeds to the subsequent step S505.

If $L_{uv}$ is less than T (NO in step S504), the processing proceeds to step S508. In step S508, the object region determination unit 105 adds one to m so as not to select an object region candidate. In step S505, the object region determination unit 105 extracts an object region candidate $S_{uv}$ corresponding to the map coordinates (u, v). In step S506, the object region determination unit 105 stores the current likelihood and the object region candidate as $L_n$ and $S_n$, respectively. In step S507, the object region determination unit 105 compares n and N. If n is more than or equal to N (YES in step S507), the processing ends. If n is less than N (NO in step S507), the processing proceeds to step S508. In step S508, the object region determination unit 105 adds one to n. In step S509, the object region determination unit 105 adds one to m. The processing then returns to step S501. The predetermined number N of object region candidates are selected in the present exemplary embodiment, but a method of determining the number of object region candidates to be selected is not limited thereto. For example, the object region candidates may be selected so that a total value of likelihood $L_n$ is more than or equal to a predetermined value.

<Integration of Object Region Candidates>

Figure 6A:
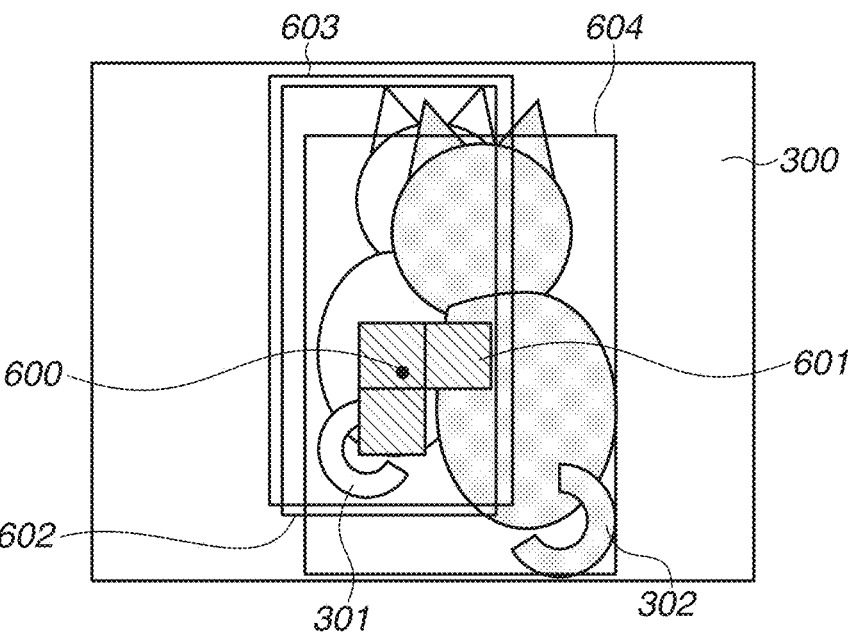
FIGS. 6A to 6C each illustrate an example of integration of the object region candidates.
Figure 6B:
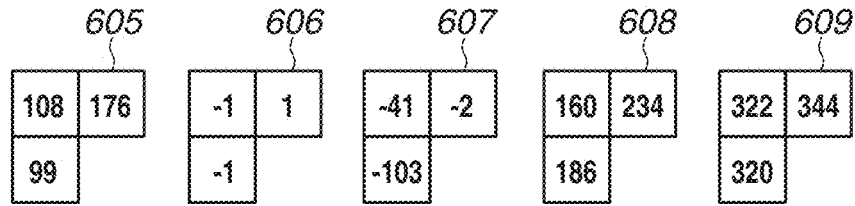
Figure 6C:
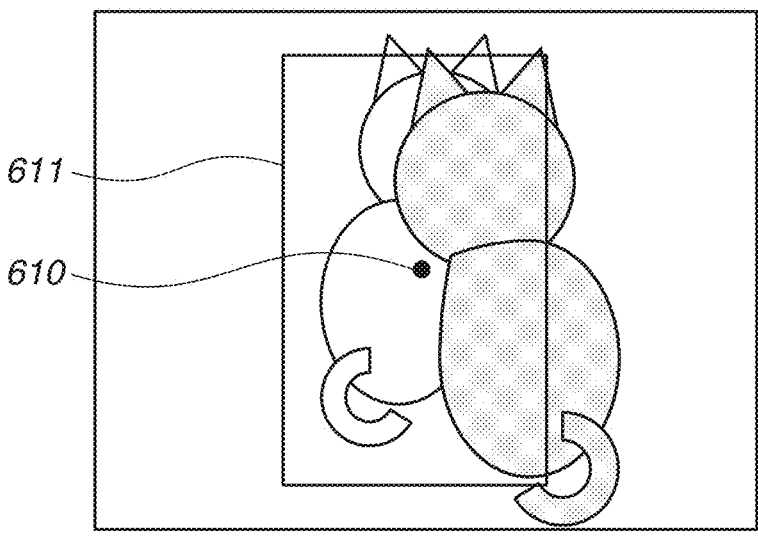

The integration of the object region candidates that is performed by the object region determination unit 105 in FIG. 1 and that is performed in step S209 in FIG. 2 is now described with reference to FIGS. 6A to 6C. In the present exemplary embodiment, a description is provided, as an example, of a case where the user selects the subject 301 behind the subject 302. In a case where the user selects the subject 302 in front of the subject 301, similar processes are performed while the instructed coordinates are different. In a case where the user wishes to select the subject 301 behind the subject 302, the user instructs a portion 600 corresponding to the subject 301 behind the subject 302 as illustrated in FIG. 6A. The instructed coordinates are (235, 245) in the image coordinate system, and are converted by using Expression 1 into coordinates (4.2, 4.4) in the map coordinate system. Performing the above-mentioned object region candidate selection processing results in selection of a hatched portion 601, that is, a portion corresponding to coordinates of (4, 4), (4, 5), and (5, 4), which are the nearest, the second nearest, and the third nearest to the coordinates (4.2, 4.4), respectively, in the map coordinate system. Thus, $L_{44}$, $L_{45}$, and $L_{54}$ are substituted into likelihood $L_1$, $L_2$, and $L_3$, respectively, and $S_{44}$, $S_{45}$, and $S_{54}$ are substituted for object region candidates $S_1$, $S_2$, and $S_3$, respectively. Object region candidates corresponding to $S_{44}$, $S_{45}$, and $S_{54}$ are illustrated as regions 602, 603, and 604, respectively. FIG. 6B illustrates likelihood 605, an x-offset amount 606, a y-offset amount 607, a width 608, and a height 609 each corresponding to the hatched portion 601. FIG. 6C illustrates a result of the integration of the object region candidates. A center position 610 is a center position of the integrated object region candidates, and an object region candidate 611 is obtained by addition of a width and a height to the center position 610.

The integration of the object region candidates is now described using a specific calculation example. Initially, the respective center positions of the object region candidates in the image coordinate system are calculated. From FIG. 6B, an x offset amount of an object region candidate $S_{44}$ is −1, and a y-offset amount of the object region candidate $S_{44}$ is −41. Based on Expression 1, image coordinates corresponding to map coordinates (4, 4) are (225, 225). The offset amounts of the object region candidate $S_{44}$ (the region 602) are added to the image coordinates (225, 225), so that the coordinates of the center position (224, 184) of the object region candidate in the image coordinate system are acquired. Similarly, coordinates of the center position (224, 172) of an object region candidate $S_{45}$ (the region 603), and coordinates of the center position (276, 223) of an object region candidate $S_{54}$ (the region 604) can be acquired. Weighted averaging of likelihoods is used to integrate the object region candidates. The weighted averaging of likelihoods can be calculated using the following Expression 3.

$$x = \frac{\sum_{n=1}^{N} L_n \times x_n}{\sum_{n=1}^{N} L_n} \qquad \text{Expression 3}$$

In Expression 3, $x_n$ is a value that is a target of weighted averaging, and x is a result of the weighted averaging. For example, in a case where an x-coordinate at the center position of the integrated object region is calculated, an x-coordinate at the center position of the object region candidate corresponding to $S_n$ is only required to be substituted for $x_n$. Similarly, a y-coordinate at the center position, a width, and a height are substituted into Expression 3, so that the center position, width, and height of the integrated object region can be obtained.

Substituting 0 for an initial value of the likelihood $L_n$ enables acquisition of the object region integrated using Expression 3 even in a case where the number of object region candidates having likelihood exceeding the threshold T is less than the predetermined number N within the threshold D of the distance. In a case where all of the likelihoods $L_n$ is zero, it is determined that there is no object region.

The above-mentioned exemplary embodiment is summarized as follows. The image conversion is initially performed so that the likelihood map and the object region candidates can be acquired. The acquisitions of the likelihood map and the object region candidates are implemented by the multi-layered neural network. The object region determination unit 105 selects three object region candidates that are located near the coordinates that are instructed by the user and acquired by the instruction reception unit 104. The object region determination unit 105 performs, on the selected object region candidates, weighted averaging with the likelihood serving as a weight, thus integrating the selected object region candidates into a single object region. As a result, even in a case where the likelihood map indicates a strong reaction to a subject in front of the other subject as illustrated in FIGS. 3A and 3B, the object region 611 that corresponds to the subject behind the other object and that is as intended by the user is output, as illustrated in FIG. 6C.

<First Modification>

Values of the likelihood map are used when the object region candidates are integrated in the first exemplary embodiment, but a distance between the coordinates (instructed coordinates) acquired by the instruction reception unit 104 and each object region candidate may be used. In a first modification, as the distance between the instructed coordinates and the object region candidate becomes shorter, a weight used for weighted averaging to be used for integrating the object region candidates is increased. More specifically, the weight for weighted averaging is calculated using a reciprocal number of the distance between the instructed coordinates ($P_x$, $P_y$) and the object region candidate as expressed by the following Expression 4.

$$W_n = \frac{L_n}{1 + d((P_x, P_y), (u, v)_n)} \qquad \text{Expression 4}$$

In Expression 4, $(u, v)_n$ are map coordinates corresponding to the likelihood $L_n$. The distance is calculated using the Euclidean distance in the map coordinate system used in Expression 2. A weighted average is calculated using a weight $W_n$ obtained by using Expression 4 in substitution for the likelihood $L_n$ in Expression 3, thus enabling the integration of the object region candidates reflecting a distance from a designated position.

In the above description, the weight for weighted averaging is re-calculated in the step of integrating the object region candidates, but a likelihood map reflecting a distance from the instructed coordinates may be preliminarily calculated. The likelihood map reflecting the distance from the instructed coordinates is referred to as a corrected likelihood map. A corrected likelihood map $K_{ij}$ is calculated by using the following Expression 5.

$$K_{ij} = \frac{L_{ij}}{1 + d((Px, P_y), (i, j))} \qquad \text{Expression 5}$$

In Expression 5, calculation to divide every element of the likelihood map $L_{ij}$ by a distance between the instructed coordinates and the corresponding element is performed, and a result is substituted for the corrected likelihood map $K_{ij}$.

The first modification enables integration of the object region candidates with an increased emphasis placed on an object region candidate that is nearer to the instructed coordinates than the other candidates, compared with the other candidates.

<Second Modification>

In a second modification, an example of extending the method of selecting the object region candidates by interpolating the likelihood map and each channel of the object region candidate tensor is described.

Figure 7:
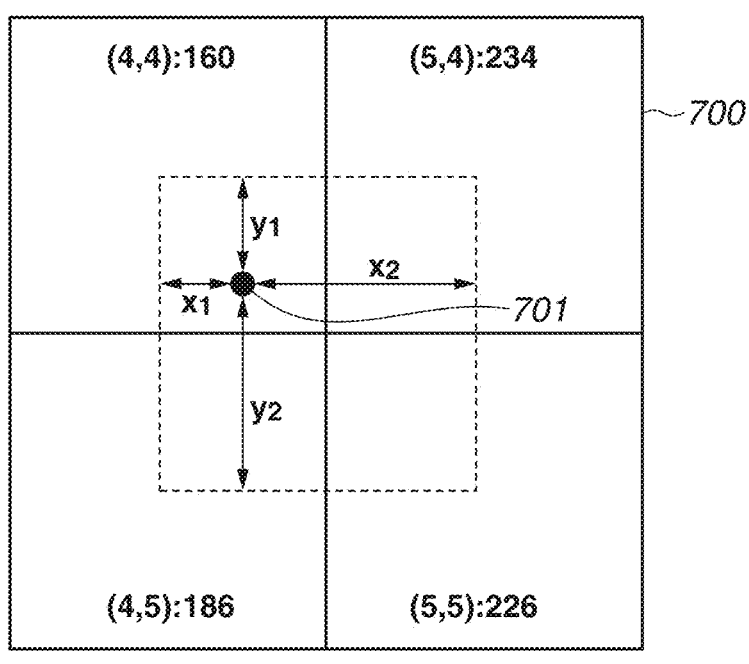
FIG. 7 illustrates an example of bilinear interpolation.

The interpolation is initially described with reference to FIG. 7. FIG. 7 illustrates an excerpt of part of the map of the width of the object region candidate illustrated in FIG. 4D (the third channel of the above-mentioned object region candidate tensor). FIG. 7 illustrates an example of applying bilinear interpolation in a case where coordinates of a point 701 are provided in a map of a width 700 that is an excerpt of map coordinates (4, 4) to (5, 5). An interpolation method is not limited to bilinear interpolation, and other interpolation methods represented by nearest neighbor interpolation and bicubic interpolation may be used. Interpolation processing may be similarly applied to a range other than the range from the map coordinates (4, 4) to (5, 5). The values inside parentheses indicated in each element of the map of the width 700 in FIG. 7 represent map coordinates, a value indicated on the right side of the colon represents a width of the object region candidate at the coordinates.

As illustrated in FIG. 7, distances in the x-direction between the point 701 and corresponding map coordinates are $x_1$ and $x_2$, and distances in the y-direction between the point 701 and corresponding map coordinates are $y_1$ and $y_2$. For example, in a case where the map coordinates of the point 701 are (4.2, 4.4), $x_1$ is 0.2, $x_2$ is 0.8, $y_1$ is 0.4, and $y_2$ is 0.6. The bilinear interpolation is implemented as the following Expression 6 using distances between the point 701 and the respective map coordinates in the x-direction and the y-direction.

$$S = \frac{S_{44} \times x_2 y_2 + S_{54} \times x_1 y_2 + S_{45} \times x_2 y_1 + S_{55} \times x_1 y_1}{(x_1 + x_2) \times (y_1 + y_2)} \quad \text{Expression 6}$$

$S_{ij}$ is a value at the map coordinates (i, j) serving as a target of interpolation, and S is a result of interpolation. In the example in FIG. 7, $S_{ij}$ is a width of the object region candidate at the map coordinates (i, j). An interpolation value with respect to a height of the object region candidate can also be obtained through similar calculation. To interpolate the offset amount with respect to the object region candidate, the offset amount is to be preliminarily converted into the center position of the object region candidate. Regarding a method of converting the offset amount into the center position, refer to <Integration of Object Region Candidates> in the first exemplary embodiment. For likelihood map, the interpolation value can also be calculated through a similar procedure.

With use of the interpolation, likelihood and an object region candidate at any coordinate position can be acquired. Here, selection of object region candidates using interpolation is described with reference to FIG. 8. Consideration is given to a case where a captured image 800 is provided, the user wishes to select a subject 802, and instructed coordinates 801 are provided. Consideration is also given to a plurality of concentric circles (e.g., a concentric circle 803) having different radii about the instructed coordinates 801. Points (e.g., a point 804) obtained by division of each concentric circle by a predetermined number are referred to as a neighboring point group. In the present exemplary embodiment, the object region determination unit 105 selects a value obtained by the interpolation of the object candidate region at the instructed coordinates 801 and the neighboring point group. However, the object region determination unit 105 does not select, among the neighboring point group, a point located outside a range of the map coordinates.

Assume that the number of concentric circles is Nr, a difference between radii of adjacent concentric circles is dr, and a difference in the number of division between the adjacent concentric circles is dq. These values are preliminarily set. For example, Nr is set to 3, dr is set to 0.5, and dq is set to 4 in FIG. 8. When consideration is given to an nr-th concentric circle from the instructed coordinates 801, its radius $r_{nr}$ is calculated from Expression 7, and the number of division $q_{nr}$ is calculated from Expression 8.

$$r_{nr} = nr \times dr \quad \text{Expression 7}$$

$$q_{nr} = \begin{cases} 1 & \text{if } nr = 0 \\ nr \times dq & \text{otherwise} \end{cases} \quad \text{Expression 8}$$

In Expressions 7 and 8, assume that nr=0 indicates the instructed coordinates 801, and a radius $r_0$ is equal to zero and the number of division $q_0$ is equal to one at this time. The concentric circle 803 is the third concentric circle from the center, and a radius $r_3$ is 3, and the number of division $q_3$ is 12.

Figure 8:
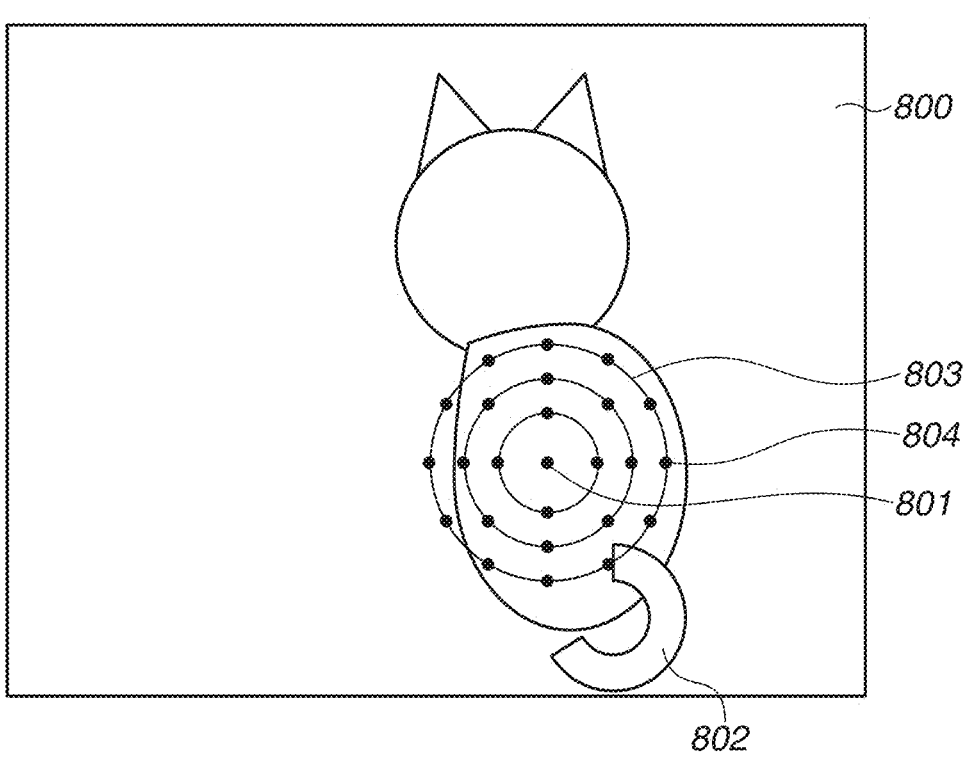
FIG. 8 illustrates an example of selection of an object region candidate using interpolation.

Likelihood of the object at the instructed coordinates 801 and the neighboring point group are acquired by the interpolation of the likelihood map. An index indicating a neighboring point is herein defined. Consideration is given to the neighboring point group on the nr-th concentric circle. Assume that a neighboring point located in the upper direction is a zeroth neighboring point, and remaining neighboring points are numbered in a clockwise direction. Assume that an index of a q-th neighboring point is (nr, q). An index of a neighboring point located the next to the zeroth neighboring point on the left side is (nr, $q_{nr}$−1). A neighboring point 804 in FIG. 8 is expressed by an index (3, 3).

Expression 3 is modified using the above-mentioned index, so that a weighted average using the likelihood for the object region candidate according to the present modification can be calculated (Expression 9).

$$x = \frac{\sum_{nr=0}^{Nr} \sum_{q=0}^{q_{nr}-1} L_{(nr,q)} \times x_{(nr,q)}}{\sum_{nr=0}^{Nr} L_{(nr,q)}} \quad \text{Expression 9}$$

In Expression 9, $L_{(nr, q)}$ is an interpolation value of the likelihood at the neighboring point expressed by the index (nr, q). $x_{(nr, q)}$ is a value that is a target of weighted averaging at the neighboring point expressed by the index (nr, q), and x is a result of the weighted averaging. For example, in a case where an x-coordinate at the center position of the integrated object region is calculated, an interpolation value of an x-coordinate at the center position of the object region candidate corresponding to the neighboring point expressed by the index (nr, q) is only required to be substituted for $x_{(nr, q)}$. Similarly, a y-coordinate at the center position, a width, and a height are substituted into Expression 3, so that the center position, width, and height of the integrated object region can be obtained.

With use of the radius $r_{nr}$ of the concentric circle, the distance between the instructed coordinates and the object region candidate can be reflected as described in the first modification.

$$W_{(nr,q)} = \frac{L_{(nr,q)}}{(1 + r_{nr})} \quad \text{Expression 10}$$

$r_{nr}$ is the radius of the nr-th concentric circle expressed by Expression 7. Replacing $L_{(nr, q)}$ in Expression 9 with $W_{(nr, q)}$ in Expression 10 enables integration of the object region candidates reflecting the distance between the instructed coordinates and each object region candidate.

In a case where there is no choice but to trim weight of the multi-layered neural network due to restrictions on a circuit mounted on the imaging apparatus 110, a resolution of the map coordinates which are output from the multi-layered neural network becomes low. A low resolution of the map coordinates results in an increase in shift between the instructed coordinates and the map coordinates even if the map coordinates in the neighborhood of the instructed coordinates are selected. In the second modification, interpolation of the likelihood map and each channel of the object region candidate tensor enables integration of the object region candidates without dependence on the resolution of the map coordinates.

<Third Modification>

The position of the object region determined in the integration of the object region candidates in step S209 according to the first exemplary embodiment is calculated from the positions of the object region candidates determined by selection of the object region candidates. However, there is a possibility that the object region acquired by the integration of the object region candidates in step S209 is different from the object region intended by the user depending on accuracy of the likelihood map.

In a third modification, the object region acquired as a result of the integration of the object region candidates in step S209 according to the first exemplary embodiment is corrected based on the coordinates (instructed coordinates) acquired by the instruction reception unit 104 and values of the likelihood map.

A specific correction method is described with reference to FIG. 10.

A method of acquiring only likelihood regarding the object region and correcting the likelihood is initially described.

object region likelihood representing likelihood of presence of the object region 1001 acquired by the integration of the object region candidates in step S209 is acquired. A Euclidean distance between a center position 1002 at coordinates $(C_x, C_y)$ corresponding to the center of an object region 1001 in the image coordinate system and a point 1003 at coordinates $(I_x, I_y)$ resulting from the conversion of the coordinates $(M_x, M_y)$ of each point on the likelihood map into the coordinates in the image coordinate system is calculated using a distance function similar to Expression 2. The object region likelihood is acquired using a value of the likelihood map corresponding to one or more points having a small Euclidean distance from the coordinates $(C_x, C_y)$. The method of acquiring the object region likelihood may be, for example, a value of the likelihood map corresponding to a point with the smallest Euclidean distance, or may be an average of values of the likelihood map corresponding to a plurality of points with small Euclidean distances. In a case where the object region likelihood thus obtained is lower than or equal to a predetermined value, the object region is presumably an object region that is estimated to have low probability of presence of the object. Thus, there is a possibility that the object region 1001 having the center position 1002, which is different from the position instructed by the user as instructed coordinates 1004, is estimated. It is highly likely that moving the center position 1002 of the object region in a direction toward the instructed coordinates 1004 directly corrects the object region to be the region intended by the user. As the method of moving the object region in the direction toward the instructed coordinates, replacing the center position 1002 of the object region with the instructed coordinates 1004 is conceivable. The object region is also shifted in accordance with the shift of the center position. Another conceivable method is to determine an amount of movement in accordance with object region likelihood $L_o$. As an example, components $V_x$ and $V_y$ of a movement vector V1008 from the center position of the object region are obtained through Expressions 11 and 12, using a maximum value $L_{max}$ output in the likelihood map, the above-mentioned object region likelihood $L_o$, and a vector D1007 from the center position 1002 of the object region to the instructed coordinates. Applying the vector V1008 to the center position 1002 of the object region enables correction of the position of the object region.

$$V_x = \left(1 - \frac{L_o}{L_{max}}\right)D_x \qquad \text{Expression 11}$$

$$V_y = \left(1 - \frac{L_o}{L_{max}}\right)D_y \qquad \text{Expression 12}$$

Another conceivable method is to correct the object region in accordance with a value of the likelihood map near the instructed coordinates.

In step S902, the CPU initially acquires object likelihood regarding a point(s) near the instructed coordinates (object likelihood near the instructed coordinates). A Euclidean distance between the instructed coordinates 1004 $(S_x, S_y)$ and each point 1003 on the likelihood map at coordinates $(I_x, I_y)$ converted into the image coordinate system is calculated, and the object likelihood near the instructed coordinates regarding the point(s) near the instructed coordinates is acquired from one or more points on the likelihood map at coordinates $(I_x, I_y)$ that are near the instructed coordinates 1004. The acquisition of the object likelihood near the instructed coordinates may be, for example, acquisition of a value of the likelihood map corresponding to a point that is the nearest to the instructed coordinates, or an average of values of the likelihood map corresponding to nearest neighbor points N to the instructed coordinates. In a case where the object likelihood near the instructed coordinates acquired in this manner is high, it can be said that probability of presence of the object in the neighborhood of the instructed coordinates is estimated to be high. With this configuration, moving the center position 1002 of the object region in the direction toward the instructed coordinates enables correction of the object region to the region near the position intended by the user, as in the correction based on the above-mentioned object region likelihood.

Figure 9:
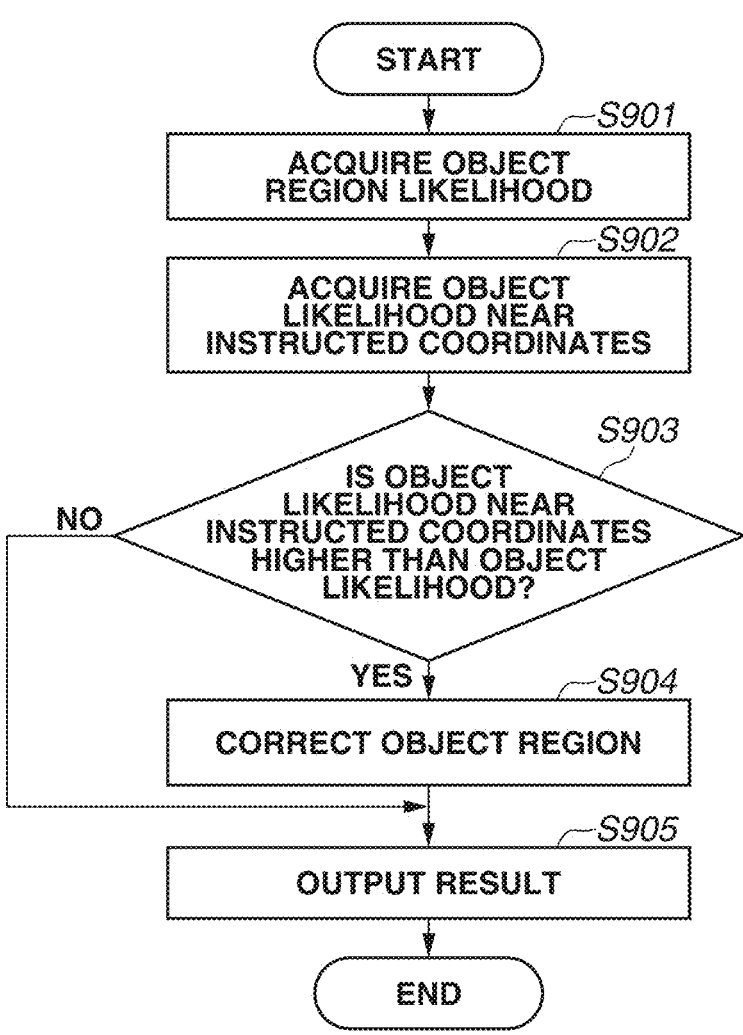
FIG. 9 is a detailed flowchart which is performed by an object region correction unit.

Another conceivable correction method is to acquire both the object region likelihood and the object likelihood near the instructed coordinates and use these two likelihoods. The processing of the correction method using both the object region likelihood and the object likelihood near the instructed coordinates is described following the flowchart in FIG. 9 and FIG. 10.

In step S903, the CPU initially compares the object region likelihood and the object likelihood near the instructed coordinates. If the object likelihood near the instructed coordinates is higher than the object region likelihood (YES in step S903), the processing proceeds to step S904. In step S904, the CPU performs correction processing based on the center position 1002 of the object region obtained by the integration of the object region candidates in step S209 and the instructed coordinates 1004. In contrast, if the object likelihood near the instructed coordinates is lower than or equal to the object region likelihood (NO in step S903), the processing proceeds to step S905. In step S905, the result output unit 120 outputs the object region obtained by the integration of the object region candidates without change.

A correction method is described with reference to an example illustrated in FIG. 10. When the object region 1001 is a rectangle, a width and a height of the rectangle are set to a size of the object. The result output unit 120 outputs, in step S905, a new object region 1005 with coordinates ($C_x$, $C_y$) of the center position 1002 of the estimated rectangle replaced with the instructed coordinates 1004 ($S_x$, $S_y$), as a corrected object region. Another conceivable method is to move the object region in a direction in which it is estimated that the object is more likely to exist, in accordance with a value of the object region likelihood in the object region 1001 and a value of the object likelihood near the instructed coordinates at the instructed coordinates 1004. Assume that D1007 represents a vector from the instructed coordinates 1004 to the center position 1002 of the object region, $L_s$ represents the object likelihood near the instructed coordinates, and $L_o$ represents the object region likelihood. Components $V_x$, $V_y$ of the vector V for moving the object region in accordance with each likelihood are calculated using Expressions 14 and 15. A position at which the vector V thus obtained is applied to the center position 1002 of the object region is set to the center position of the new object region, so that the object region 1001 is also correctable in a direction toward a region having higher likelihood.

$$V_x = \frac{L_s}{(L_s + L_o)} D_x \qquad \text{Expression 14}$$

$$V_y = \frac{L_s}{(L_s + L_o)} D_y \qquad \text{Expression 15}$$

With use of an object region correction unit according to the third modification, the object region is correctable to an object region that is nearer to the object intended by the user than the object region output as a result of the integration of the object region candidates in step S209 according to the first exemplary embodiment.

Figure 10:
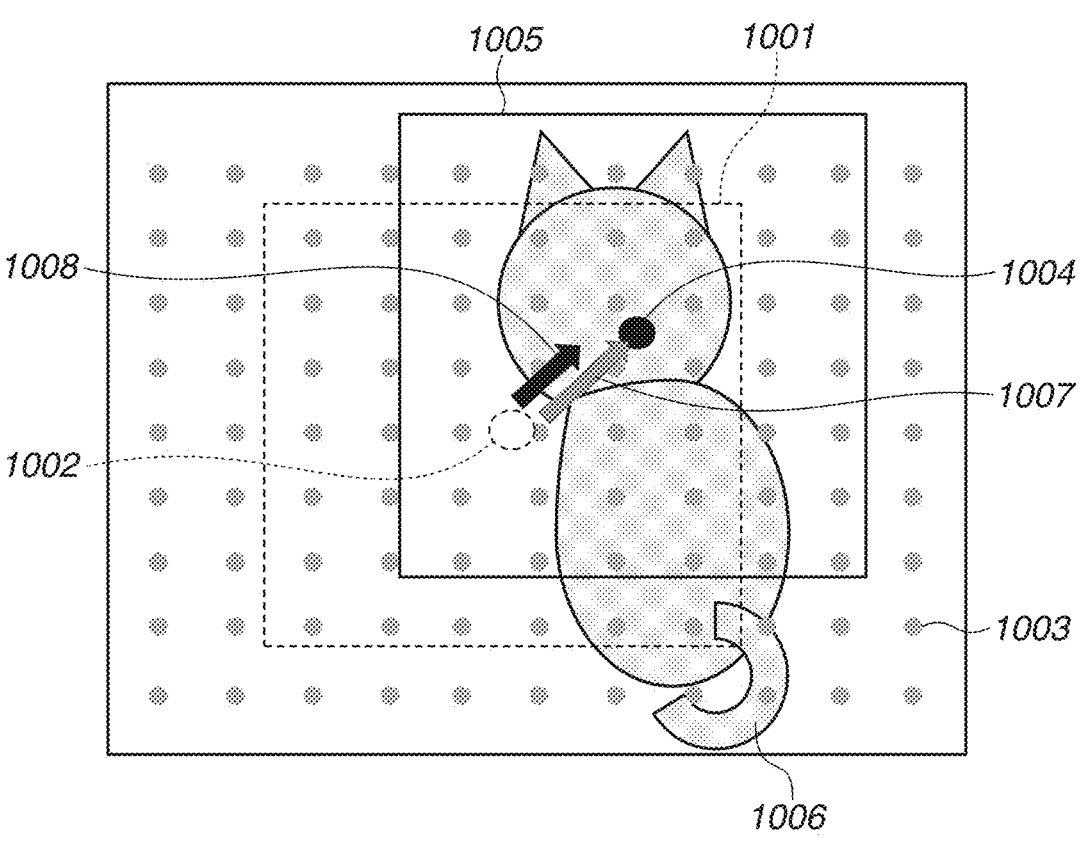
FIG. 10 illustrates an example of correction of an object region.

In a case where a likelihood map estimation unit is implemented using a limited calculation resource, the likelihood map and the object region candidates become limited in accuracy, and there is a possibility that the position of the object cannot be grasped as with the object region 1001 illustrated in FIG. 10. Even if the instructed coordinates 1004 accurately indicate the position of the object, there is a case where the output object region is estimated to be an object region not intended by the user. In such a case, according to the third modification, the object region is correctable to the object region 1005 that accurately grasps a subject 1006 intended by the user, using the instructed coordinates 1004 and the likelihood map <Fourth Modification>

The image processing apparatus 100 according to any one of the above-mentioned exemplary embodiment and modifications thereof uses one likelihood map acquisition unit 102 to acquire the likelihood of the object included in the captured image. Hence, the accuracy of the likelihood map acquisition unit 102 directly influences the accuracy of the object region acquired by the object region determination unit 105. Furthermore, a second likelihood map acquisition unit is introduced in a fourth modification to further increase the accuracy of the object region.

Figure 11:
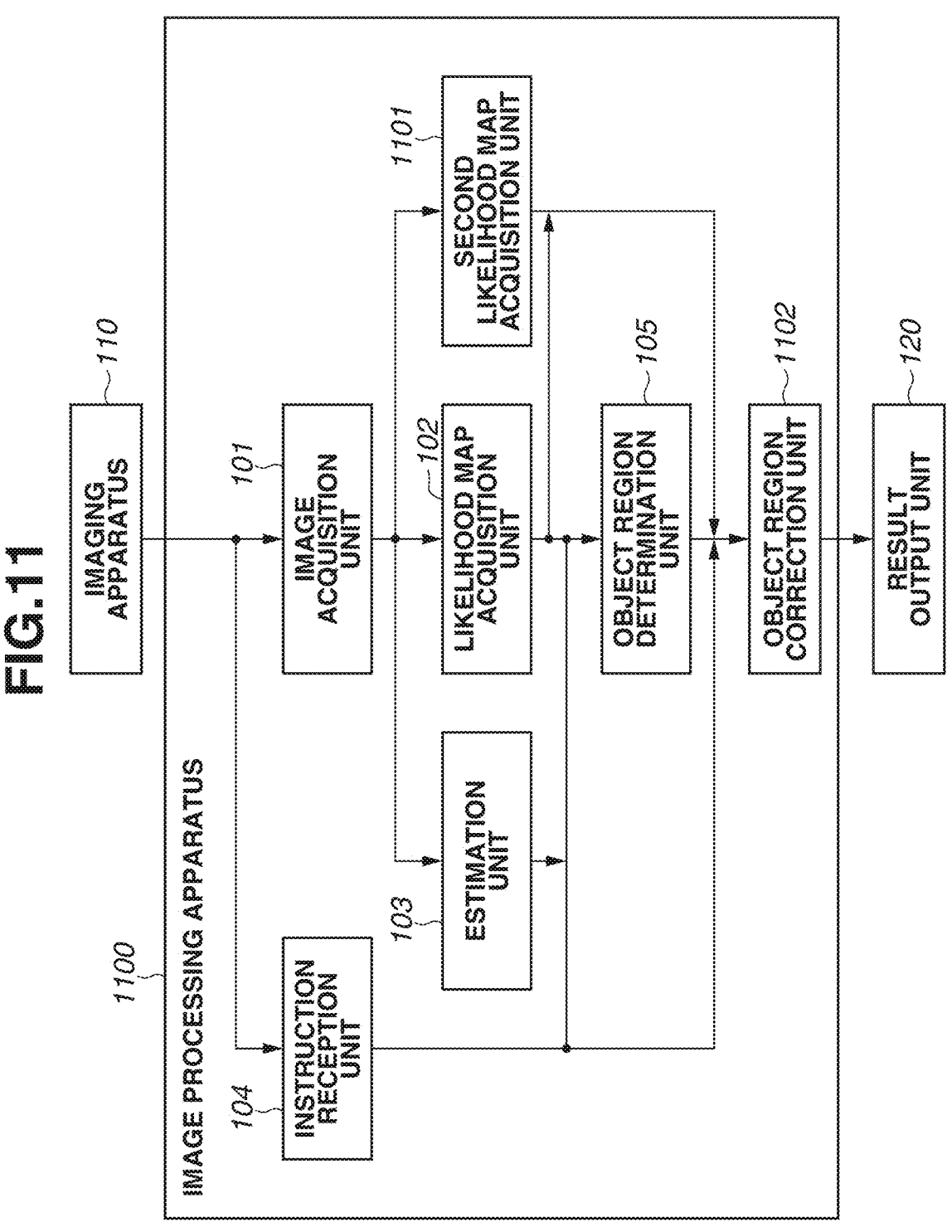
FIG. 11 is a block diagram illustrating an image processing apparatus including a second likelihood map acquisition unit.

A configuration of an image processing apparatus according to the present modification is described with reference to FIG. 11.

An image processing apparatus 1100 has a configuration similar to that according to the first exemplary embodiment, and includes a second likelihood map acquisition unit 1101 and an object region correction unit 1102. A configuration regarding the processes until the object region determination unit 105 acquires one object region based on the captured image obtained by the image acquisition unit 101 and the instructed coordinates obtained by the instruction reception unit 104 are similar to the configuration according to the first exemplary embodiment. The second likelihood map acquisition unit 1101 receives the captured image acquired by the image acquisition unit 101, and outputs a second likelihood map. The object region correction unit 1102 receives the object region, instructed coordinates, a likelihood map, and a second likelihood map, and the result output unit 120 outputs one object region correction result.

Figure 12:
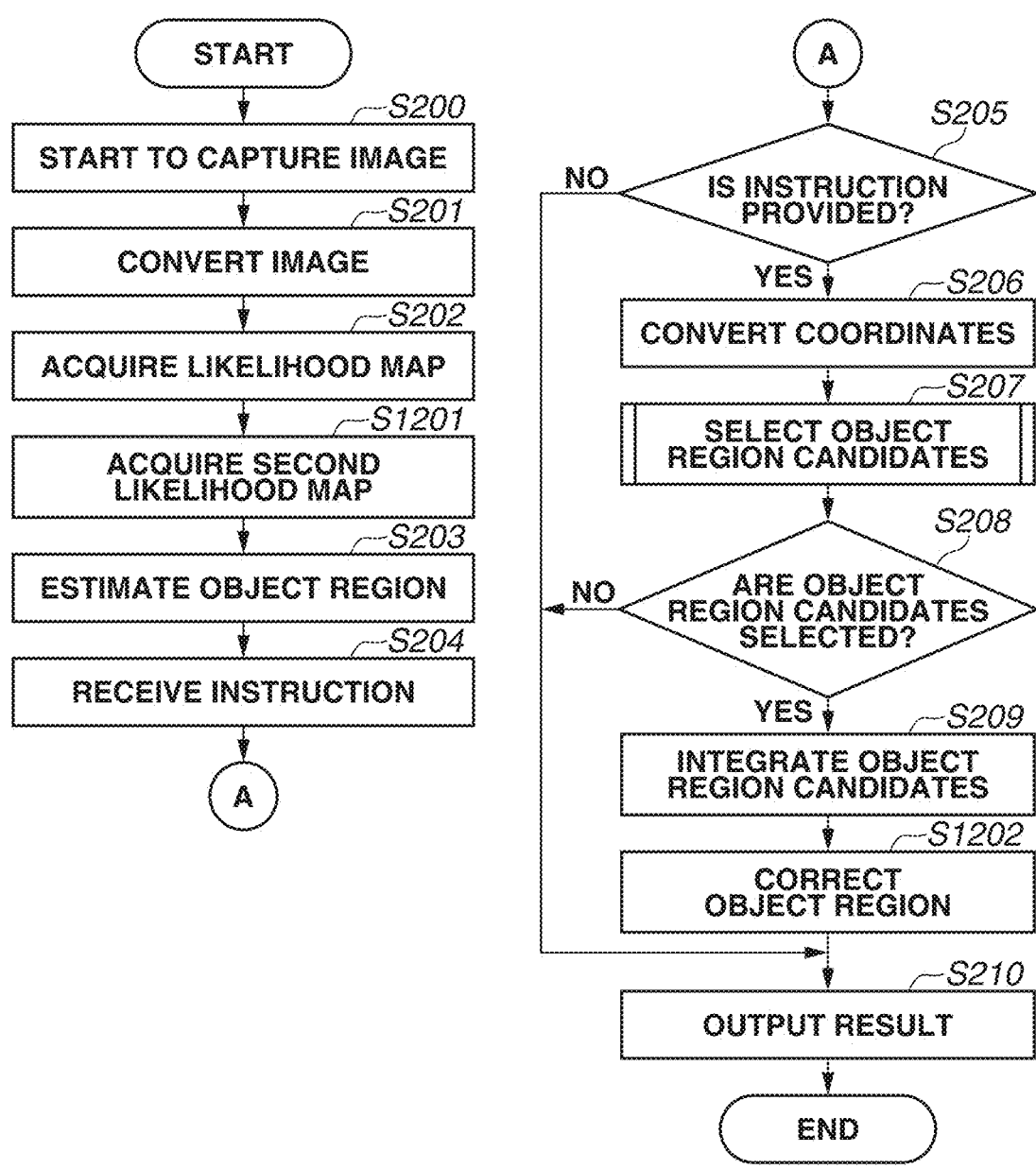
FIG. 12 is a detailed flowchart which is performed by the image processing apparatus including the second likelihood map acquisition unit.

Subsequently, the specific processing is described with reference to the flowchart in FIG. 12.

The processes from capturing an image in step S200 to acquiring the likelihood map in step S202 are similar to those according to the first exemplary embodiment. In step S1201, the second likelihood map acquisition unit 1101 acquires the second likelihood map. In the acquisition of the second likelihood map in step S1201, the second likelihood map acquisition unit 1101 outputs a likelihood map that is different from the likelihood map according to the first exemplary embodiment. For example, the second likelihood map acquisition unit 1101 may use a color histogram and/or a density of edge, or may use a multi-layered neural network that has been trained by a training method different from that in the first exemplary embodiment. The processes from acquiring the object region candidates in step S203 subsequent to the operation of acquiring the second likelihood map in step S1201 to integrating the object region candidates in step S209 are similar to those in the first exemplary embodiment. In step S1202, the object region correction unit 1102 performs correction on one object region integrated through the process of integrating the object region candidates in step S209, using the instructed coordinates, the likelihood map acquired through the process of acquiring the likelihood map in step S202, and the second likelihood map acquired by the second likelihood map acquisition unit 1101.

The correction method is, for example, to initially acquire a vector V1007 for correcting the object region through processes similar to those performed by the object correction unit according to the third modification using the instructed coordinates and the likelihood map acquired through the process of acquiring the likelihood map in step S202. Subsequently, the object region correction unit 1102 acquires a distance between a point resulting from conversion of each point on the second likelihood map into the image coordinate system and a point resulting from conversion of the instructed coordinates into the image coordinate system, and a value of the second likelihood map corresponding to the coordinates of the second likelihood map at the smallest distance between the points serves as second object likelihood near the instructed coordinates $Ls_2$. The object region correction unit 1102 acquires second object region likelihood $Lo_2$ using a value of the second likelihood map corresponding to one or more points at a short distance between a position at coordinates ($C_x$, $C_y$) corresponding to the center of the object region and the point resulting from the conversion of each point of the second likelihood map into the image coordinate system. A method of acquiring the second object region likelihood may be to acquire a value of the second likelihood map that is the nearest to the coordinates $(C_x, C_y)$, or may be to acquire an average of values of the second likelihood map corresponding to a plurality of points at small distances from the coordinates $(C_x, C_y)$.

The object region correction unit 1102 calculates each component of a second vector W for correcting the position of the object region through Expressions 16 and 17 using the second object region likelihood $Lo_2$, the second object likelihood near the instructed coordinates $Ls_2$, and the vector D1007 from the center position of the object region to the instructed coordinates, which are obtained as described above.

$$W_x = \frac{L_{s2}}{(L_{s2} + L_{o2})}D_x \qquad \text{Expression 16}$$

$$W_y = \frac{L_{s2}}{(L_{s2} + L_{o2})}D_y \qquad \text{Expression 17}$$

A conceivable method for correcting the position of the object region is to apply an average vector of the vector V in the third modification and the second vector W thus obtained to the center position of the object region output from the object region determination unit 105.

In step S210, the result output unit 120 outputs one object region corrected by the object region correction unit 1102 according to the fourth modification.

With use of the second likelihood map acquisition unit 1101 in addition to the likelihood map acquisition unit 102 according to any one of the above-mentioned exemplary embodiment and the modifications thereof, it is possible to output the object region having higher likelihood.

The second likelihood map acquisition unit 1101 acquires the likelihood map from the color histogram and/or the density of edge, so that determination of validity of the object region to be output according to the above-mentioned exemplary embodiment and the modifications thereof is enabled with a method different from the method using the likelihood map acquisition unit 102. Alternatively, the second likelihood map acquisition unit 1101 using the multi-layered neural network trained by training data is different from training data for the likelihood map acquisition unit 102 according to the first exemplary embodiment increases the accuracy of the object region. Another conceivable method is, for example, to train the second likelihood map acquisition unit 1101 so as to react to a specific object that is likely to be erroneously detected and correct the object region by the object region correction unit 1102 based on the information. This enables correction of reliability of the likelihood map, which is referred to at the time of correction of the object region, with reliability of the likelihood map reflected in various perspectives.

The present disclosure having the above-mentioned configurations enables provision of the image processing apparatus capable of detecting the object region intended by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-037599, filed Mar. 10, 2022, and No. 2022-037600, filed Mar. 10, 2022, which are hereby incorporated by reference herein in their entirety.

What is claimed is:

1. An image processing apparatus, comprising:
an image sensor configured to acquire a captured image;
at least one memory storing a program; and
at least one processor that executes the stored program, which causes the at least one processor to:
receive an instruction with respect to the captured image;
input the captured image to a trained neural network having a plurality of layers and obtain, as outputs of the trained neural network:
(i) a likelihood map comprising a one-channel tensor having a plurality of rows and a plurality of columns, each element of the likelihood map indicating likelihood of presence of a center of an object in a corresponding predetermined region of regions into which the captured image is divided; and
(ii) an object region candidate tensor comprising four channels having the plurality of rows and the plurality of columns, the four channels respectively indicating an x-direction offset, a y-direction offset, a width, and a height for an object region candidate;
correct the likelihood map based on a distance from the position indicated by the instruction to each element of the likelihood map to generate a corrected likelihood map;
determine an object region corresponding to the instruction using the corrected likelihood map and one or more object region candidates selected based on the position indicated by the instruction; and
generate a focus adjustment signal for the image capturing apparatus based on the determined object region.

2. The image processing apparatus according to claim 1, wherein the at least one processor further sequentially selects a predetermined number of candidates in order from an object region at a nearest neighbor position with respect to the position indicated by the instruction.

3. The image processing apparatus according to claim 1, wherein the at least one processor further determines the object region corresponding to the instruction without using an object region that is estimated to have likelihood that is less than or equal to a threshold and low probability of presence of the object.

4. The image processing apparatus according to claim 1, wherein the at least one processor further integrates the object region candidates using weighted averaging of values of the likelihood map.

5. The image processing apparatus according to claim 1, wherein the at least one processor further integrates the object region candidates based on a distance between the position indicated by the instruction and each of the object region candidates.

6. The image processing apparatus according to claim 1, wherein the at least one processor further makes a correction to shift a center position of the object region to a position at which likelihood increases, in a case where likelihood at the position indicated by the instruction is higher than likelihood in the object region on the likelihood map.

7. The image processing apparatus according to claim 1, wherein the at least one processor further selects an object region candidate corresponding to one or more coordinates in a concentric circle about the position indicated by the instruction.

8. The image processing apparatus according to claim 1, wherein the at least one processor further acquires the likelihood map using a neural network having a plurality of layers.

9. The image processing apparatus according to claim 1, wherein the at least one processor further estimates the region using a neural network having a plurality of layers.

10. An image processing system, comprising:
an image sensor configured to acquire a captured image;
at least one memory storing a program; and
at least one processor that executes the stored program, which causes the at least one processor to:
receive an instruction with respect to the captured image;
input the captured image to a trained neural network having a plurality of layers and obtain, as outputs of the trained neural network:
(i) a likelihood map comprising a one-channel tensor having a plurality of rows and a plurality of columns, each element of the likelihood map indicating likelihood of presence of a center of an object in a corresponding predetermined region of regions into which the captured image is divided; and
(ii) an object region candidate tensor comprising four channels having the plurality of rows and the plurality of columns, the four channels respectively indicating an x-direction offset, a y-direction offset, a width, and a height for an object region candidate;
correct the likelihood map based on a distance from the position indicated by the instruction to each element of the likelihood map to generate a corrected likelihood map;
determine an object region corresponding to the instruction using the corrected likelihood map and one or more object region candidates selected based on the position indicated by the instruction received; and
generate a focus adjustment signal for the image capturing apparatus based on the determined object region.

11. An image processing method, comprising:
acquiring a captured image;
receiving an instruction with respect to the captured image;
inputting the captured image to a trained neural network having a plurality of layers and obtain, as outputs of the trained neural network:
(i) a likelihood map comprising a one-channel tensor having a plurality of rows and a plurality of columns, each element of the likelihood map indicating likelihood of presence of a center of an object in a corresponding predetermined region of regions into which the captured image is divided; and
(ii) an object region candidate tensor comprising four channels having the plurality of rows and the plurality of columns, the four channels respectively indicating an x-direction offset, a y-direction offset, a width, and a height for an object region candidate;
correcting the likelihood map based on a distance from the position indicated by the instruction to each element of the likelihood map to generate a corrected likelihood map;
determining an object region corresponding to the instruction using the corrected likelihood map and one or more object region candidates selected based on the position indicated by the received instruction; and
generating a focus adjustment signal for the image capturing apparatus based on the determined object region.

12. A non-transitory computer-readable storage medium storing a computer-executable program for causing a computer to perform the method according to claim 11.

\* \* \* \* \*